United States Patent [19]

Petron

[11] 4,085,859
[45] Apr. 25, 1978

[54] CAR-TOP BOAT LOADER
[76] Inventor: Roman L. Petron, 836 E. George, Hazel Park, Mich. 48030
[21] Appl. No.: 691,373
[22] Filed: Jun. 1, 1976
[51] Int. Cl.² ............................................. B60R 9/00
[52] U.S. Cl. ............................... 214/450; 224/42.1 H
[58] Field of Search ................... 214/450; 224/42.1 H
[56] References Cited
U.S. PATENT DOCUMENTS

| | | | |
|---|---|---|---|
| 2,613,020 | 10/1952 | Berry | 214/450 |
| 3,155,257 | 11/1964 | Showler | 214/450 |
| 3,830,389 | 8/1974 | Van Acker | 214/450 |
| 3,837,514 | 9/1974 | Barnes | 214/450 |

Primary Examiner—Drayton E. Hoffman
Assistant Examiner—Ross Weaver

[57] ABSTRACT

A retrofit car-top boat loader for loading a boat on a car already fitted with a car-top carrier of the type including at least front and rear spaced carrier bars, fixedly supported on the car top parallel to each other and transversely with respect to the longitudinal centerline of the car, the carrier bars extending generally out to the sides of the car, the loader comprising an elongated member, such as a pipe or tube, having a length preferably exceeding the maximum width at the gunwales of the boat to be transported and the distance between the opposite outer edges of the carrier bars, whichever is greater, the loader having a yoke member mounted thereon near one end thereof, the yoke opening in a direction away from its mounting and being pivotable about its mounting axis, and means for securing the elongated member to the tops of the front and rear carrier bars, parallel to the side of the car and with the yoke mounting axis being disposed vertically.

10 Claims, 6 Drawing Figures

CAR-TOP BOAT LOADER

BRIEF SUMMARY OF THE INVENTION

This invention relates to car-top boat loaders, and more particularly to a retrofit loader adapted for cars already equipped with a car-top carrier comprising a pair of parallel, transverse, spaced carrier bars.

Transporting of boats, gunwale down, atop cars is well known and popular, and a number of devices have been proposed to enable one person to load and unload the boat, by himself and with relative ease.

An object of this invention is to provide such a retrofit device that is characterized by simplicity of design, manufacture and use and that provides improved control of the boat during loading and unloading by one person.

A more specific object of the invention is to provide a car-top boat loader that comprises a loader bar having means for fixedly securing the same across the top of the carrier bars generally adjacent and parallel to the side of the car and means for slidably receiving one gunwale of the boat during loading and unloading for control purposes.

A still further object of the invention is to provide such a device that comprises an elongated structural member of uniform cross section, such as a square or other tube, having a length, for standard loader purposes, approximately equal to, and no less than, the maximum expected width at the gunwales of the boat to be carried or to the greatest expected distance between the outer edges of the carrier bars, whichever is greater, so that the member can be mounted across the top of the carrier bars to provide maximum rigidity and so that a standard length member can accommodate the widest carrier bar spacing possible and the greatest possible boat width for a range of cars.

A further object of the invention is to provide such a device having a yoke type gunwale guide means with 360° freedom of rotation, providing the boat stability necessary to enable one person to load a boat alone, with minimum risk of injury or damage to the boat, car or person.

These and other objects and advantages of the invention will become more readily apparent by reference to the following specification and the accompanying drawings.

DETAILED DESCRIPTION

Figure 1:
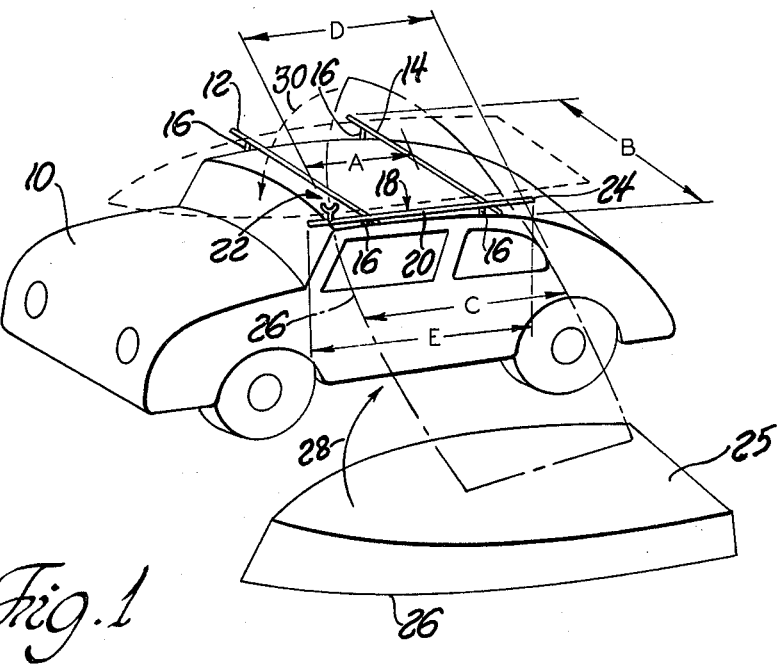
FIG. 1 is a perspective view illustrating a vehicle having a retrofit boat loader embodying the invention and the manner in which the loader may be used in loading and unloading a boat onto and from the top of the vehicle.

Referring now to the drawings, which are intended to illustrate preferred embodiments of the invention without limiting the same thereto, and throughout which like elements are identified with the same or like reference numerals, FIG. 1 generally illustrates the invention and its use.

Vehicle or car 10, which may be of any make and size, is shown fitted with a car-top carrier that includes a front carrier bar 12 and a rear carrier bar 14, each fixedly secured to the car top, transverse to the car centerline, by any suitable means, such as supports 16. Where the car is already fitted with such a carrier, the invention is a retrofit or aftermarket loader device for use with such carrier bars 12 and 14 or the equivalent thereof. However, where supplied in combination, the invention includes the carrier bars.

The boat loader 18 comprises the elongated member 20, which is removably secured across the tops of the ends of bars 12 and 14 so as to be positioned generally parallel to and adjacent the side of the car as shown. It will be noted that member 20 carries a yoke member 22 for a purpose to be described.

Referring still to FIG. 1, it will be noted that the following dimensions are generally illustrated:

(1) The dimension A between the outermost edges (front edge of 12 and rear edge of 14) of bars 12 and 14.

(2) The lengths B of the bars 12 and 14.

(3) The maximum width C at the gunwale 26 of the boat 25 to be loaded.

(4) The dimension D between the center of the yoke member 22 and the opposite end 24 of the elongated member 20.

(5) The length E of the elongated member 20.

Generally, for purposes of the invention, dimension B must be no less, and preferably somewhat greater than, C so that the bars 12 and 14 are of sufficient length to support the loaded up-side-down boat 25. Also, E must be greater than A so that the member 20 can be mounted across the tops of bars 12 and 14. Further, D must be no less than, and preferably somewhat greater than, C so that when one gunwale of the boat is positioned in the yoke member 22, the opposite gunwale will be resting on member 20 near the opposite end 24 thereof.

With the above relative dimensions, the boat can be easily loaded on the car by one person, with the boat under excellent control because yoke 22 functions like a second person, as follows:

(a) Position the boat 25 bottom-side-up on the ground parallel to but spaced about six feet from the car 10, with the bow of the boat adjacent the front of the car and the transom generally parallel or in line with the rear carrier bar 14, as shown in solid lines in FIG. 1.

(b) Lift the bow of the boat and place it on the member 20, with the gunwale 26 in the yoke member 22, as represented by the solid-line arrow 28 and the broken-line boat outline in FIG. 1.

(c) Pick up the boat transom and push the boat forward on member 20 until approximately one third or more of the boat is on the member 20 and positioned over the car top.

(d) Swing the rear of the boat over the top of the car and place it on the rear carrier bar.

(e) Pick up the bow of the boat, lifting the gunwale 26 out of the yoke 22, and place the boat on the front carrier bar 12.

(f) Lash boat down in any desired manner.

Eventually, steps (c) and (d) may be combined, as represented by the dotted-line arrow 30. Unloading is accomplished by reversal of the loading steps. It will be noted that the member 20, being mounted across the top of the carrier bars 12 and 14 and positioned adjacent and parallel to the side of the car top, can serve as an abutment against which the gunwale 26 can rest, for added lateral stability in one direction while the lashed-down boat is being transported. If two loaders 18 were employed, one on each side of the car, the boat 25 would have such an abutment at each gunwale for good lateral stability in both directions. It might be desirable to use a loader 18 on each side, as where, for example, fishing is done in an area of rough or wooded terrain and one side of the car, as it was or must be parked, may not be accessible for boat loading.

Figure 2:
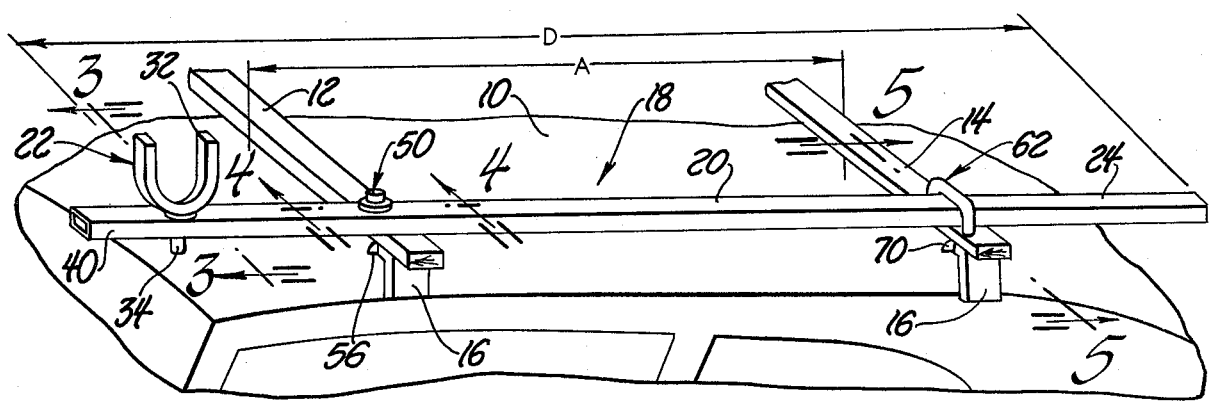
FIG. 2 is a fragmentary portion of FIG. 1, enlarged to illustrate the invention in greater detail.
Figure 3:
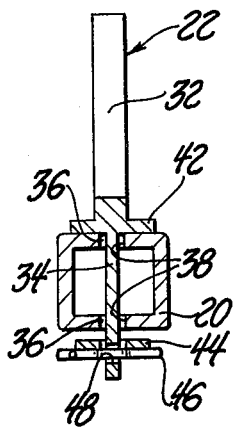
FIG. 3 is an enlarged cross-sectional view taken on the plane of line 3—3 of FIG. 2, looking in the direction of the arrows.

Referring now to FIGS. 2 and 3, it will be seen that yoke member 22 comprises a generally U-shaped portion 32 opening away from the pivot pin portion 34 received with clearance 36 in vertically-aligned passages 38 formed in the top and bottom walls at the end 40 of member 20, which is shown as a rectangular or square metal tube. The yoke 22 may be formed with an integral bearing collar 42 and be retained by a washer 44 and spring clip 46 received in an opening 48 in the end of the pivot pin 34.

With the above yoke structure, loading (and unloading) step (d) is easily accomplished by one person with complete control of the boat, since the yoke holds the gunwale and prevents displacement of the boat in either lateral direction, while allowing sliding the boat through yoke 22 and free pivoting of the yoke 22 a full 360° if necessary and swinging of the boat 10, without binding or other limitation. Without the yoke 22, if the boat began to slide laterally, or at an angle, in any direction while pushing it onto the loader 18 and/or swinging the boat over the car, steps (c) and (d), control could be lost and the car, boat or person could be damaged or injured. Of course, the yoke opening is wide enough to receive the widest anticipated boat gunwale 26 with clearance to permit sliding the gunwale through the yoke.

Figure 4:
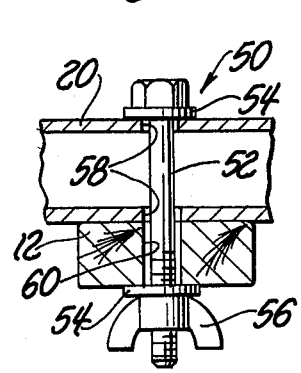
FIG. 4 is an enlarged cross-sectional view taken on the plane of line 4—4 of FIG. 2, looking in the direction of the arrows.

FIGS. 2 and 4 illustrate first means 50 for fixedly securing the elongated tube member 20 to the front carrier bar 12. This means comprises a bolt 52, washers 54 and a wing nut 56, the bolt 52 passing through preformed aligned holes 58 in member 20 and a hole 60 drilled in carrier bar 12 at the time of initial assembly of the loader 18 to the car fitted with carrier bars 12 and 14.

Figure 5:
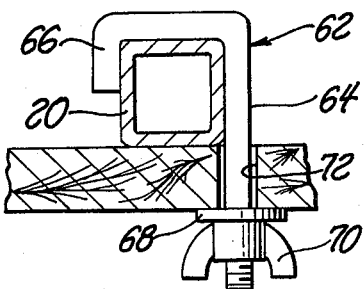
FIG. 5 is an enlarged cross-sectional view taken on the plane of line 5—5 of FIG. 2, looking in the direction of the arrows.

FIGS. 2 and 5 illustrate second means 62 for fixedly securing member 20 to rear carrier bar 14. Means 62 comprises a J-bolt 64 having a square-corner hook portion 66, a washer 68 and a wing nut 70. In the case of means 62, the passage 72 is drilled through rear bar 14 at the time of initial assembly of the loader 18. However, no openings are formed in member 20 for J-bolt 64; rather, the hook portion 66 of J-bolt 64 merely hooks over member 20 at whatever portion thereof rests on bar 14, which will depend upon the spacing of bars 12 and 14. Preferably, passages 60 and 72 drilled in bars 12 and 14, respectively, are positioned so that member 20 lies parallel to the centerline of the car, and with the hook 66 positioned inwardly.

With the securing means 50 and 62, the loader 18 is easily installed, as a retrofit for a car already provided with a car-top carrier having bars 12 and 14, or the equivalent thereof, and it is easily removed and subsequently reassembled.

Figure 6:
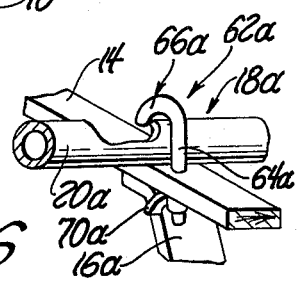
FIG. 6 is a fragmentary perspective view illustrating a modification of the invention.

FIG. 6 illustrates another embodiment of the invention, wherein the elongated member 20a is a cylindrical tube and the hook portion 66a of the J-bolt 64a is annular, as opposed to the square-cornered hook 66 of J-bolt 64 in FIG. 5, to accommodate the annular outer shape of tube 20a. Also, the support 16a for the carrier is shown inboard of the J-bolt 64a, as opposed to the outboard location of support 16 of FIGS. 2–5.

From the above description, it will be seen that the invention provides a retrofit boat loader 18 that is simply manufactured, mostly from standard readily available components, and that is easily installed, or removed and reinstalled. Further, the loader enables one person to easily load and unload a boat 25, with excellent control of the boat provided by the yoke 22, particularly against lateral or other undesired boat movement in any direction, while allowing sliding the boat gunwale through the yoke and swinging of the boat over and away from the cartop any amount up to 360°. Further, the loader, being mounted atop the carrier bars provides a side abutment, substantially along the major length of the boat, against which the boat can be lashed for greater transport stability.

As previously stated, the invention is not limited to a retrofit device, but includes the concept of initially providing the combination of the removable loader 18 and the carrier bars 12 and 14 disclosed herein.

The invention has been shown and described so clearly and concisely as to enable one skilled in the art to practice the same. While only a preferred embodiment and one modification are shown, for purposes of illustration, certain changes may be made within the scope of the invention, and no limitations are intended, except as recited in the following claims.

What I claim as my invention is:

1. A retrofit car-top boat loader for loading a boat, gunwhale down, atop a car already fitted with a car-top carrier of the type that includes spaced front and rear carrier bars fixedly supported on the car top parallel to each other and transverse to the longitudinal centerline of the car, the transverse carrier bars extending generally out to each side of the car top, said loader comprising a loader bar, said bar comprising an elongated member having a cross-section of sufficient dimension to provide an effective abutment along substantially the entire length thereof against which the boat gunwhale can be retained in transit, an effective length at least equal to the maximum width of the boat at the gunwhale and a minimum overall length at least equal to the dimension between the outside edges of the carrier bars, whichever is greater, and a yoke member comprising a generally U-shaped portion having a width sufficient to receive a boat gunwhale with clearance so that the boat gunwhale can be moved without interference through said yoke during loading and unloading and a pivot pin extending from said U-shaped portion, said yoke member being pivotally mounted directly on and to said elongated member near one end thereof, with said yoke member physically engaging said elongated member, said yoke being open away from said elongated member and pivotable, said pivot pin extending normal to the centerline of said elongated member, said effective length being equal to the dimension between said yoke opening and the opposite end of said bar, and means for securing said elongated member directly to the top of the front and rear bars so that said elongated member is disposed entirely above the top surfaces of the front and rear bars.

2. A loader such as that recited in claim 1, wherein said yoke is pivotable 360° about said axis of said pivot pin.

3. A loader such as that recited in claim 1, wherein said securing means comprises first means for securing said elongated member to the front carrier bar and second means for securing said elongated member to the rear carrier bar.

4. A loader such as that recited in claim 3, wherein said first means comprises a threaded element having a threaded axis parallel to said yoke axis, said element extending from the center of the side of said elongated member opposite said yoke and adapted to pass vertically through an opening therefor in the front carrier bar.

5. A loader such as that recited in claim 3, wherein said second means comprises a J-bolt with a threaded portion adapted to pass through an opening in the rear carrier bar and a hook portion adapted to merely hook over said elongated member at a position where said elongated member rests on the rear carrier bar.

6. A loader such as that recited in claim 1, wherein said securing means comprises first means for securing said elongated member at a predetermined position thereon to one of said carrier bars and second means for securing said elongated member to the other of said carrier bars at a variable position thereon where said elongated member crosses said other carrier bar.

7. A car-top boat loader for loading a boat gunwhale down atop a car-top carrier having spaced front and rear flat-topped carrier bars and means fixedly supporting the bars on the car top parallel to each other and transverse to the longitudinal centerline of the car, the carrier bars extending generally out to each side of the car top, said loader comprising a loader bar, said loader bar comprising a single-piece elongated square-tube member having a longitudinal axis and a length exceeding the maximum width of the boat at the gunwhale and the dimension between the outside edges of the spaced carrier bars, whichever is greater, said elongated member being free of any other separate elements but having a pivot passage nearer one end thereof, and a yoke member pivotally mounted directly on said elongated member in said pivot passage so that said yoke member physically engages said elongated member, said yoke member having a U-shaped portion opening away from said elongated member and a pivot pin disposed in said pivot passage so as to be pivotable about an axis normal to said axis of said elongated member, whereby said loader is adapted to be mounted atop and secured to said carrier bars in any desired position and without need for tools by means such as U-bolts with wing nuts, with said loader bar disposed entirely above the top surfaces of the carrier bars so as to provide an effective abutment along substantially the entire length thereof against which the boat gunwhale can be retained in transit.

8. A loader such as that recited in claim 7, wherein said elongated member is a hollow structural element.

9. A loader such as that recited in claim 7, wherein said elongated member is a square tube.

10. A loader such as that recited in claim 7, wherein said elongated member is of a length such that said yoke member is positioned, when said elongated member is secured on the car-top carrier, on one side of the spaced carrier bars.

* * * * *